United States Patent
Kumaoka

(10) Patent No.: US 11,921,294 B2
(45) Date of Patent: Mar. 5, 2024

(54) HEAD-MOUNTED DISPLAY AND METHOD FOR ADJUSTING THE SAME

(71) Applicant: JVCKENWOOD Corporation, Yokohama (JP)

(72) Inventor: Taisuke Kumaoka, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/057,100

(22) Filed: Nov. 18, 2022

(65) Prior Publication Data

US 2023/0083214 A1 Mar. 16, 2023

Related U.S. Application Data

(63) Continuation of application No. PCT/JP2021/045059, filed on Dec. 8, 2021.

(30) Foreign Application Priority Data

Dec. 11, 2020 (JP) .................................. 2020-205656

(51) Int. Cl.
 *G02B 27/01* (2006.01)
(52) U.S. Cl.
 CPC .. *G02B 27/0176* (2013.01); *G02B 2027/0154* (2013.01)
(58) Field of Classification Search
 CPC ........ G02B 27/0176; G02B 2027/0154; H04N 5/64
 See application file for complete search history.

(56) References Cited

U.S. PATENT DOCUMENTS

| | | | | |
|---|---|---|---|---|
| 10,359,806 | B2 * | 7/2019 | Osman | A63F 13/211 |
| 10,386,647 | B1 * | 8/2019 | Yu | G02B 27/022 |
| 10,488,830 | B2 * | 11/2019 | Aghara | A61B 5/6803 |
| 10,701,350 | B1 * | 6/2020 | Ebert | A61B 3/0075 |
| 11,029,525 | B2 * | 6/2021 | Lawrence | G02B 27/0179 |
| 11,478,049 | B2 * | 10/2022 | Burks | H05K 5/0086 |
| 2006/0070168 | A1 * | 4/2006 | Nakabayashi | G02B 27/0176 2/171 |
| 2009/0066607 | A1 * | 3/2009 | Yasuda | G02B 27/0176 345/8 |
| 2016/0361512 | A1 * | 12/2016 | Lawrenson | A61M 16/0683 |
| 2017/0277254 | A1 * | 9/2017 | Osman | A63F 13/32 |
| 2018/0033177 | A1 * | 2/2018 | Han | G06V 20/20 |
| 2018/0046147 | A1 * | 2/2018 | Aghara | G06F 3/012 |
| 2019/0072772 | A1 | 3/2019 | Poore et al. | |
| 2019/0167095 | A1 * | 6/2019 | Krueger | A61B 3/113 |
| 2019/0168879 | A1 * | 6/2019 | Sinusas | B64D 25/02 |

(Continued)

FOREIGN PATENT DOCUMENTS

| | | |
|---|---|---|
| JP | 2014218236 A | 11/2014 |
| JP | 2020524456 A | 8/2020 |

*Primary Examiner* — William Lu

(74) *Attorney, Agent, or Firm* — Procopio, Cory, Hargreaves & Savitch LLP

(57) ABSTRACT

A head-mounted display including; a main body configured to generate a display image; a belt configured to fix the main body to a head of a user; a first sensor configured to detect a fastening strength of the belt; a storage unit configured to store a setting regarding the fastening strength of the belt; and a drive unit configured to fasten the belt in accordance with the detection result of the first sensor and the setting.

7 Claims, 7 Drawing Sheets

(56) References Cited

U.S. PATENT DOCUMENTS

| | | |
|---|---|---|
| 2019/0324280 A1 | 10/2019 | Yildiz et al. |
| 2019/0353901 A1* | 11/2019 | Markovsky ........ G02B 27/0172 |
| 2020/0026088 A1* | 1/2020 | Tzvieli ............... G02B 27/0172 |
| 2020/0225715 A1* | 7/2020 | Goergen ................. G06T 5/006 |
| 2020/0341283 A1* | 10/2020 | McCracken ....... G02B 27/0172 |
| 2021/0080996 A1* | 3/2021 | Hudman ................ A42B 3/042 |
| 2021/0186342 A1* | 6/2021 | Bogdanovich ....... A61B 5/7282 |
| 2021/0325683 A1* | 10/2021 | Yee ......................... G06F 3/015 |

* cited by examiner

HEAD-MOUNTED DISPLAY AND METHOD FOR ADJUSTING THE SAME

CROSS REFERENCE TO RELATED APPLICATION

This application is based upon and claims the benefit of priority from Japanese patent application No. 2020-205656, filed on Dec. 11, 2020, the disclosure of which is incorporated herein in its entirety by reference.

BACKGROUND

This disclosure relates to a head-mounted display and a method for adjusting the same.

In recent years, with the development of VR (virtual reality) contents and the popularization of inexpensive devices, head-mounted display (Head Mounted Display) has become familiar. The user wears a head-mounted display on the head and the head-mounted display reproduces the content. In this way, the user can experience as if the user is in another space.

SUMMARY

However, when the user wears the head-mounted display, the user may need to adjust the belt to fit his or her head. The user feels annoyed with it. The user needs to loosen the belt when he or she takes the head-mounted display off from his or her head. Accordingly, the user uses the head-mounted display over and over again, the user needs to adjust the belt each time. There are also products that have a rubber belt or the like to fix the head-mounted display to the head, and some force may be required to take it off or wear it.

A head-mounted display according to the present embodiment includes: a main body configured to generate a display image; a belt configured to fix the main body to the head of a user; a first sensor configured to detect a fastening strength of the belt; a storage unit configured store a setting regarding the fastening strength of the belt; and a driving unit configured to fasten the belt in accordance with the detection result of the first sensor and the setting.

A method for adjusting a head-mounted display: the head-mounted display including: a main body configured to generate a display image; a belt configured to fix the main body to a head of a user; and a drive unit configured to fasten the belt, the method including; a step of detecting a fastening strength of the belt; and a step of fastening, by the drive unit, the belt in accordance with the fastening strength and a predetermined setting.

DETAILED DESCRIPTION

Specific embodiments of the present invention are described hereinafter in detail with reference to the drawings. The present disclosure, however, is not limited to the below-descried embodiments. The following description and the attached drawings are appropriately shortened and simplified to clarify the explanation.

Figure 1:
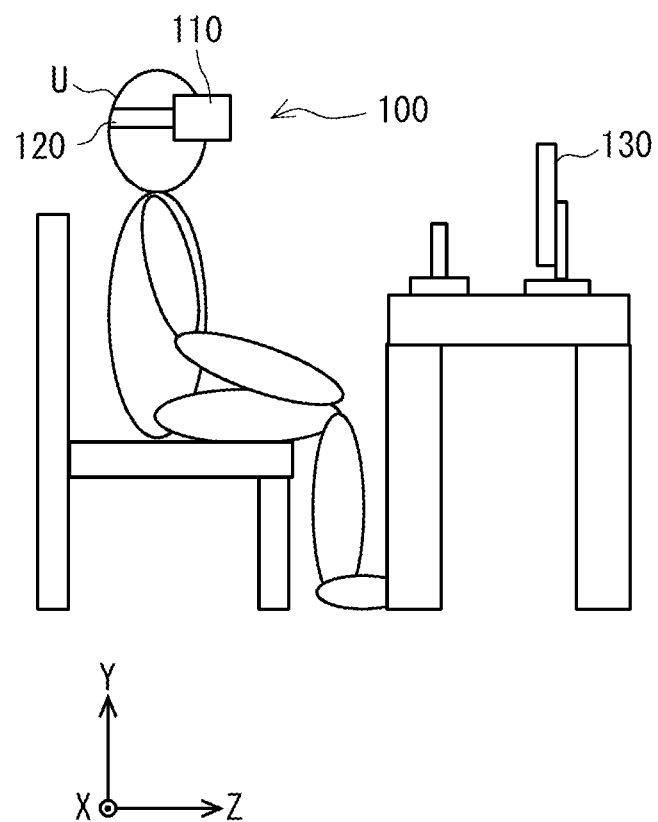
FIG. 1 is a schematic diagram showing a state in which a user wears a head-mounted display.

The head-mounted display according to the present embodiment and its adjustment method will be described with reference to the drawings. FIG. 1 is a side view schematically showing a state in which the user U wearing head-mounted display 100.

The head-mounted display 100 is applicable to various purposes, such as gaming, entertainment, industrial, medical, flight simulator, and the like. The head-mounted display 100 include VR (Virtual Reality) head-mounted display, AR (Augmented Reality) head-mounted display, and MR (Mixed Reality) head-mounted display. Note that the head-mounted display 100 is an optical see-through head-mounted display used for AR or MR in this embodiment, but may be a non-transmissive head-mounted display.

To clarify the explanation, an XYZ three-dimensional Cartesian coordinate system is used in the following description. As seen from a user, the front-back direction (depth direction) is Z direction, the left-right direction (horizontal direction) is X direction, and the up-down direction (vertical direction) is Y direction. The front direction is the +Z direction, the back direction is the −Z direction, the right direction is the +X direction, the left direction is the −X direction, the up direction is the +Y direction, and the down direction is the −Y direction.

The head-mounted display 100 includes a main body 110 and a belt 120. The user U wears the head-mounted display 100 in such a manner that the main body 110 contacts the face (the front of the head) of the user U. The main body 110 is arranged on the front side of the head of the user U and generates a display image visually recognized by the user U.

Specifically, the main body 110 has a display unit, which will be described later, and a frame for containing the display unit. For example, the main body 110 has a flat panel display such as a liquid crystal monitor or an organic EL (Electro-Luminescence) monitor as the display unit. Furthermore, the main body 110 may include an optical element for forming a display image generated by the display unit as a virtual image in front of the user U. For example, the main body 110 contains a half mirror, a concave mirror and the like in a frame.

The main body 110 has a goggles shape or a spectacles shape and is attached to the head of the user U by the belt 120. The head-mounted display 100 may be a binocular head-mounted display 100, a spectacles-shaped head-mounted display, or a monocular head-mounted display. When the head-mounted display 100 is a see-through type, such as a semitransparent type, the user U who wears the head-mounted display 100 can see an object 130 in front of him or her.

The belt 120 is attached to both right and left sides of the main body 110. The belt 120 is wound from the left side of the head to the right side of the head via the back side of the head. Therefore, the head is arranged in a space surrounded by the belt 120 and main body 110. The belt 120 may be wound from the right side of the head via the back side of the head to the left side of the head, or may be wound from the left side of the head to the back side of the head and from the right side of the head to the back side of the head.

The belt 120 is formed of an elastic material having elasticity such as rubber or resin. Thus, by fastening the belt 120 around his/her head, the head-mounted display 100 can be securely worn by the user U. The user U can thus view reproduced content in a state in which the main body 110 is in close contact with the head of the user U. The length of the belt 120 and the mounting position of the head-mounted display may be adjustable according to the size of the user's head and his/her preference.

Figure 2:
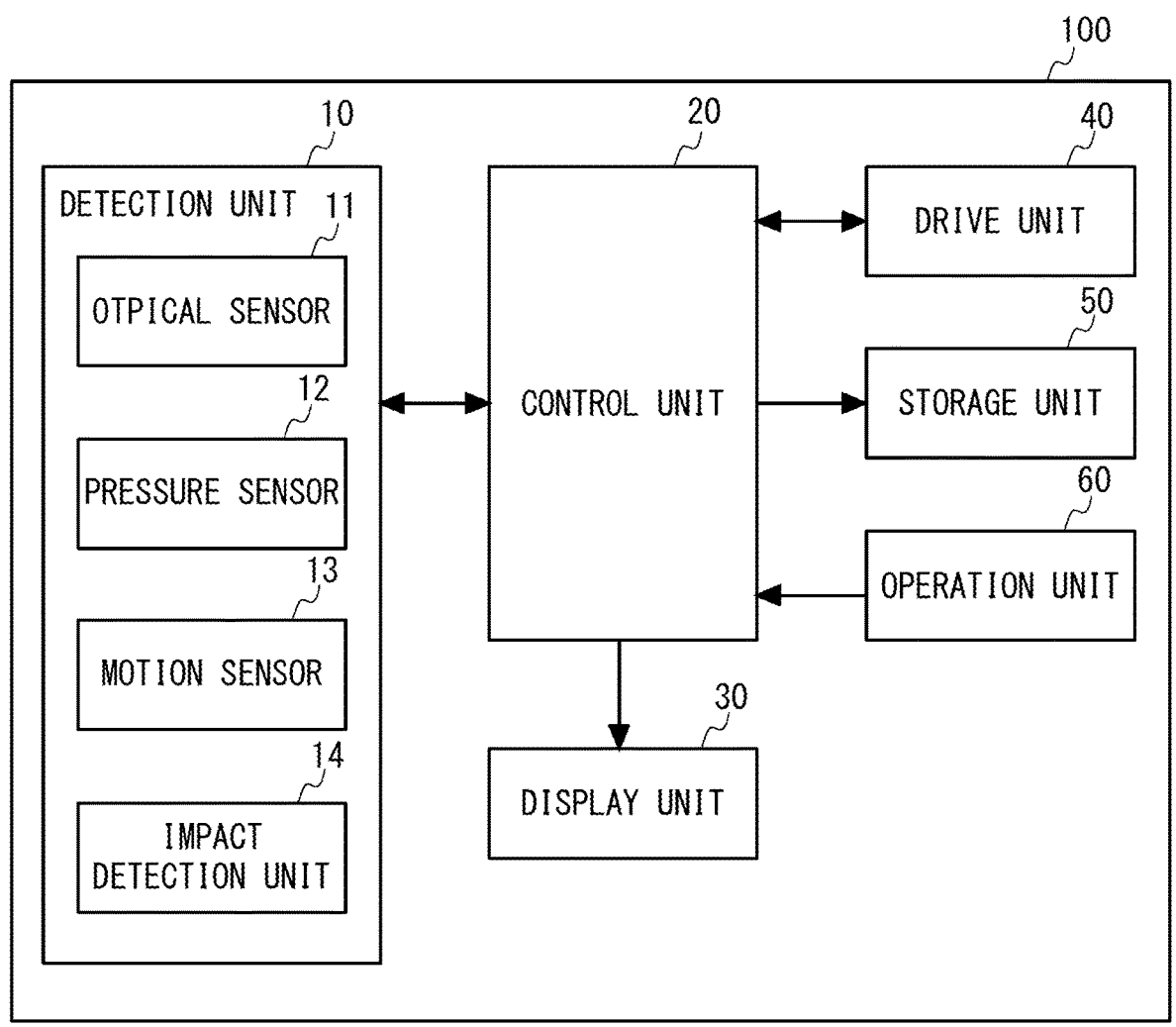
FIG. 2 is a control block diagram showing a configuration of the head-mounted display.

In this embodiment, the fastening force of the belt 120 can be adjusted. That is, the fastening strength of the belt 120 is variable. Hereinafter, a control system of the head-mounted display 100 for varying the fastening strength by the belt 120 will be described with reference to FIG. 2. FIG. 2 is a control block diagram of the head-mounted display 100.

The head-mounted display 100 includes a detection unit 10, a control unit 20, a display unit 30, a drive unit 40, a storage unit 50, and an operation unit 60. Each unit is housed in, for example, the main body 110.

The detection unit 10 has various sensors such as an optical sensor 11, a pressure sensor 12, and a motion sensor 13. The optical sensor 11 is, for example, a camera or the like, and captures images of the eyes of the user U when the user U wears the head-mounted display 100.

Specifically, the detection unit 10 can detect whether or not the user U is wearing the head-mounted display 100 appropriately in accordance with the position of the eyes in the image thereof captured by the camera. The detection unit 10 can detect whether the user U is wearing the head-mounted display 100 bisymmetrically based on the positions of the left and right eyes in the captured image.

The pressure sensor 12 is provided to detect the fastening strength in the belt 120 when the user U wears the head-mounted display 100. For example, the pressure sensor 12 is provided on a surface of the head-mounted display 100 in contact with the head of the user U. When the user U wears the head-mounted display 100, the pressure sensor 12 detects pressure exerted by the head of the user U. The sensor for detecting the fastening strength is not limited to the pressure sensor 12. A force sensor for detecting a pulling force of the belt 120, a strain sensor for detecting a strain generated in the belt 120 or the like may detect the fastening force.

The motion sensor 13 detects the movement of the head-mounted display 100. For example, as the motion sensor 13, an acceleration sensor, a magnetic sensor, a gyroscope, and the like can be used. When the user U changes the direction in which his/her head is facing, the direction in which the head-mounted display 100 is facing is also changed. The motion sensor 13 detects the operation of head-mounted display 100 based on the operation of the user U. Specifically, the motion sensor 13 detects a change in the direction in which the head-mounted display 100 is facing or a change in the position of the same. The head-mounted display changes the display image in accordance with the movement detected by the motion sensor 13.

The impact detection unit 14 detects whether an impact is applied to the head-mounted display 100 or not. For example, if the acceleration sensor provided in the head-mounted display 100 detects an acceleration greater than the threshold value, the impact detection unit 14 detects that the impact has been applied to the head-mounted display 100. The acceleration sensor for detecting the impact may be the one used as the motion sensor 13.

The drive unit 40 has a motor or the like for fastening the belt 120. For example, the drive unit 40 drives the belt 120 in the direction in which the belt 120 is pulled, and thus the fastening strength of the belt 120 can be strengthened. Alternatively, the drive unit 40 drives the belt 120 in the direction in which the belt 120 is loosened, and thus the fastening strength of the belt 120 can be weakened. Alternatively, the drive unit 40 may adjust the fastening strength by changing the length or mounting position of the elastic belt 120. The drive unit 40 drives the belt 120, and thus the fastening strength of the belt 120 can be changed. The drive unit 40 may be located near the center of the back side of the head.

The storage unit 50 stores settings about fastening strength. The storage unit 50 is a nonvolatile memory such as a flash memory. For example, the storage unit 50 stores the mounting position of the belt 120 and the detected value detected by the pressure sensor 12 as setting values. The storage unit 50 may store the length of the belt 120 or the like as settings. When there are a plurality of users U using head-mounted display 100, the storage unit 50 may store a setting for each user U. The storage unit 50 may store a plurality of settings which can be selected by the user. The storage unit 50 may store a control program, reproduced content, and the like.

The operation unit 60 has an input device for receiving the operation of the user U. The operation unit 60 includes, for example, a main body button and an external controller. The display unit 30 reproduces, for example, a menu screen for operation and contents. The display unit 30 may have, for example, a liquid crystal display for generating a left-eye image and a liquid crystal display for generating a right-eye image.

The control unit 20 has a processor or the like for controlling each unit. The control unit 20 is, for example, an MCU (Micro Control Unit) or the like. When the control unit 20 executes the control program stored in the storage unit 50, various kinds of controls described later are performed. An external video signal, a control signal, and a power source are supplied to the control unit 20. For example, a video signal or the like is input to the control unit 20 through a wired connection such as HDMI (registered trademark) or a wireless connection such as Wi-Fi (registered trademark) or Bluetooth (registered trademark). The head-mounted display 100 may be provided with a video generation unit (not shown) for generating a video signal, and the video signal or the like generated by the video generation unit may be inputted to the control unit 20. The display unit 30 performs display in accordance with the video signal.

Figure 3:
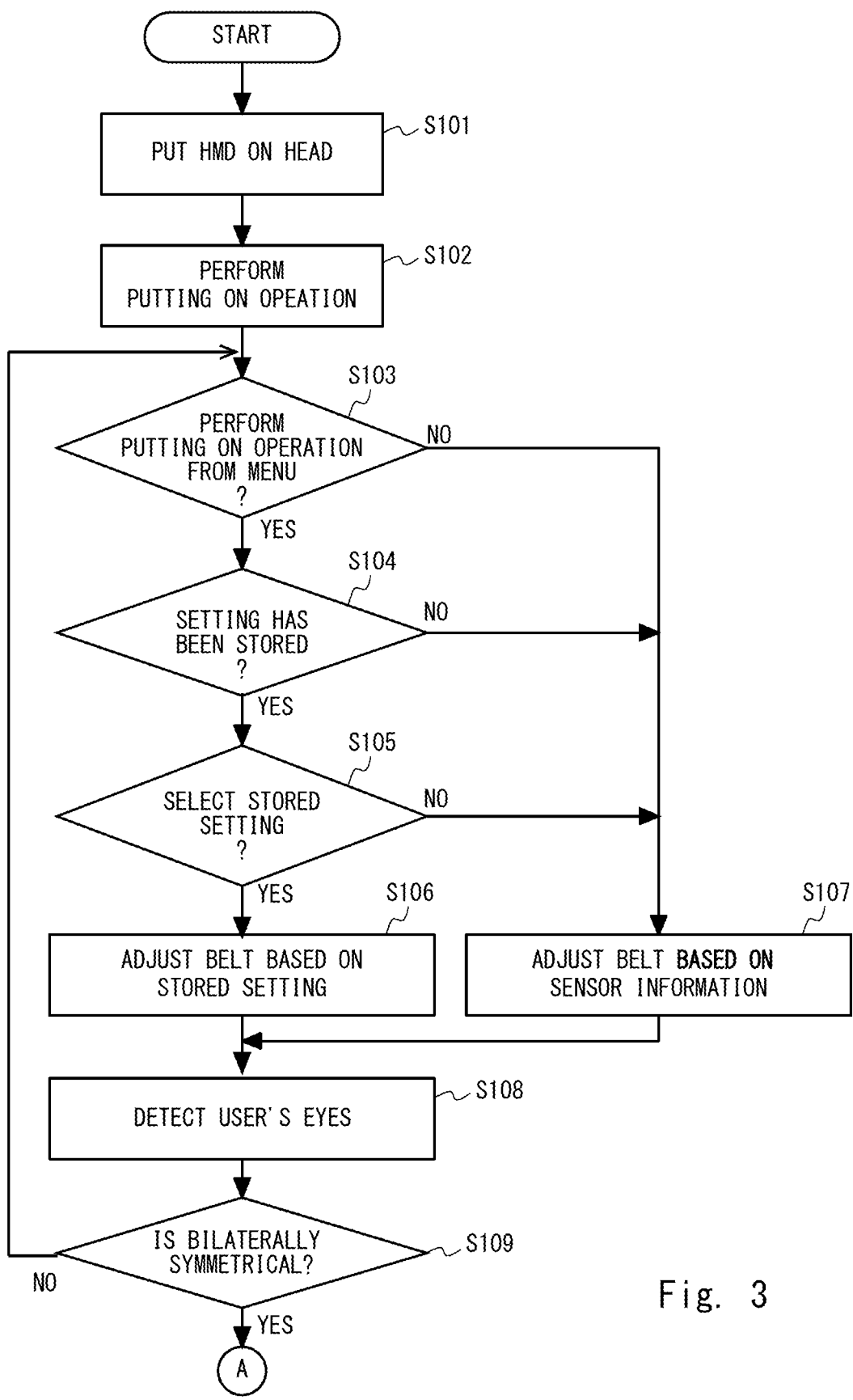
FIG. 3 is a flowchart showing an adjustment method when the user wears the head-mounted display.
Figure 4:
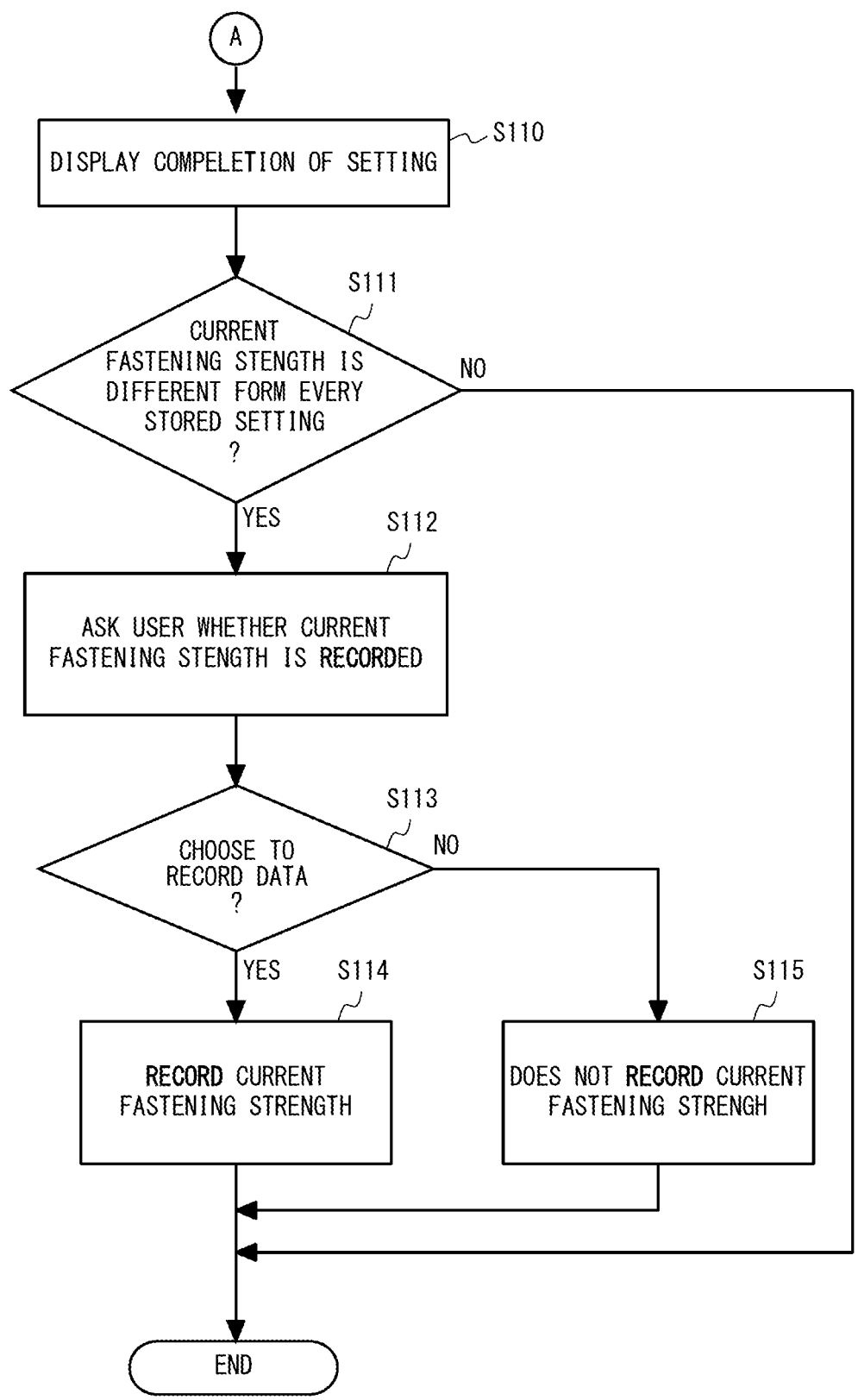
FIG. 4 is a flowchart showing an adjustment method when the user wears the head-mounted display.

Referring to FIGS. 3 and 4, the flow when the user U wears the head-mounted display 100 will be described. FIGS. 3 and 4 are flowcharts showing an adjustment method for adjusting a wearing state of the head-mounted display 100.

First, the head-mounted display 100 is put on the head of the user U (S 101). Next, an operation for putting on the head-mounted display 100 (hereafter, 'a putting on operation') is performed (S 102). The control unit 20 determines whether or not the wearing operation from the menu has been performed (S 103).

Figure 5:
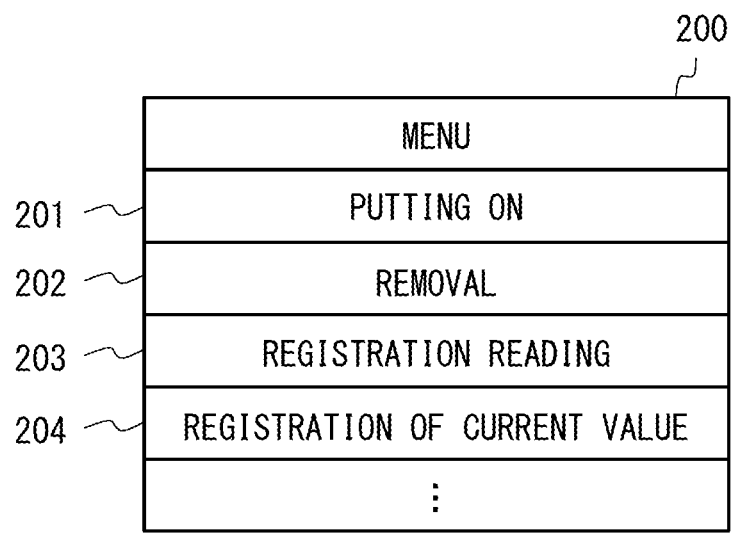
FIG. 5 is a diagram showing an example of a menu screen of the head-mounted display.

FIG. 5 shows an example of a menu screen 200 displayed on the display unit 30. On the menu screen 200, a putting on button 201, a removal button 202, a registration reading button 203, and a registration of current value button 204 are displayed. For example, when the user U places the cursor on the putting on button 201 and clicks it, the control unit 20 detects that the putting on operation has been performed.

When the putting on operation is performed from the menu (YES in S 103), the control unit 20 determines whether or not the setting has been stored in the storage unit 50 (S 104). When the setting has been stored in the storage unit 50 (YES in S 104), the control unit 20 determines whether or not the stored setting is selected (S 105).

For example, when the belt 120 is automatically adjusted, the user U clicks the registration reading button 203 on the menu screen 200. In this way, the setting registered in the storage unit 50 is read out. When a plurality of settings is registered, the display unit 30 displays a list of registered settings. Specifically, the display unit 30 displays the list of user names corresponding to settings. The user U operates the operation unit 60 to select his/her own setting. Thus, the control unit 20 detects that the stored setting has been selected. Alternatively, a voice message may be output from the speaker or the earphone to allow the user U to select the setting.

When the setting stored in the storage unit 50 is selected (YES in S 105), the drive unit 40 adjusts the belt 120 based on the stored setting (S 106). When the drive unit 40 fastens the belt 120, the fastening strength of the belt 120 becomes the setting value. That is, when the user U selects the setting suitable for him or her, the control unit 20 drives the drive unit 40 according to his/her setting. The control unit 20 controls the drive unit 40 so that the detected value of the pressure sensor 12 becomes the setting value.

When the wearing operation is not performed from the menu (NO in S 103), the drive unit 40 adjusts the belt 120 based on the sensor information (S 107). When the setting is not stored in the storage unit 50 (NO in S 104), the drive unit 40 adjusts the belt 120 based on the sensor information (S 107). When the setting stored in the storage unit 50 is not selected (NO in S 105), the drive unit 40 adjusts the belt 120 based on the sensor information (S 107). In step S107, the belt 120 is adjusted based on the detection results of various sensors such as the pressure sensor 12. For example, the drive unit 40 fastens the belt 120 so that the fastening strength of the belt 120 is the initial setting. Alternatively, the drive unit 40 may adjust the fastening strength using a setting of a person other than the user U.

Next, when the fastening strength becomes the setting, the optical sensor 11 detects the user U's eyes (S 108). The control unit 20 determines whether or not the state in which the head-mounted display 100 is being worn (hereafter, 'the wearing state') is bilateral symmetrical in accordance with the positions of the eyes (step 109). For example, it is assumed that the optical sensor 11 is a camera disposed at the center of the head-mounted display 100 in the lateral direction. The control unit 20 determines whether or not the positions of the left and right eyes are bilateral symmetrical in the captured image of the eyes captured by the camera. Specifically, when the respective distances from the left and right edges of the image to the left and right eyes are equal to each other, the head-mounted display 100 is being worn bisymmetrically. That is, when the distance from the left edge of the image to the left eye matches the distance from the right edge of the image to the right eye, the control unit 20 determines that the wearing state is bilateral symmetrical. In addition, the control unit 20 may determines that the wearing state is bilateral symmetrical when the left and right eyes are arranged horizontally in the captured image.

The control unit 20 may also determine whether or not the head-mounted display 100 is being worn symmetrically in the vertical direction. For example, the optical sensor 11 detects the position of the eyes in the height direction. That is, the optical sensor 11 detects the relative heights of the left and right eyes with respect to the head-mounted display 100. When the heights of the left and right eyes equal a predetermined height, the control unit 20 determines that the head-mounted display is worn symmetrically in the vertical direction. When the heights of the right and left eyes do not equal the predetermined height, the control unit 20 determines that the head-mounted display is not being worn symmetrically in the vertical direction. The control unit 20 calculates the number of pixels in the vertical direction indicating the distance from the upper end of the captured image to the center position of the eye and the distance from the lower end of the captured image to the center position of the eye. The control unit 20 can detect the heights of the left and right eyes in accordance with the number of pixels as described above.

When the wearing state of the head-mounted display 100 is not bilaterally symmetrical (NO in S 109), the drive unit 40 loosens the belt 120 and urges the user U to put it on again. Therefore, the process returns to step S103, and the head-mounted display 100 adjusts the belt 120 again. If the wearing state of the head-mounted display 100 is bilaterally symmetrical (YES in S 109), the display unit 30 indicates that the putting on the head-mounted display 100 is completed (S 110). Of course, the head-mounted display 100 may notify the user U of the completion of the putting on of the head-mounted display 100 by a voice message, instead of the display unit 30 indicating the same. The user U can manually adjust the length of the belt 120 or the like after the putting on of the head-mounted display 100 is completed. Alternatively, when the wearing state of the head-mounted display 100 is worn symmetrical, the drive unit 40 may drive the belt so as to fasten it. Therefore, it is possible to hold the head-mounted display 100 in an appropriate wearing position.

As described above, the drive unit 40 adjusts the fastening strength of the belt 120. Thereafter, the user U can manually adjust the belt 120. For example, the user U may manually adjust the length or the like of the belt 120 after step 110. When the user U manually adjusts the belt 120, the fastening strength of the belt 120 is shifted from the setting. Therefore, the control unit 20 determines whether or not the current fastening strength is different from every stored setting (step 111). For example, the control unit 20 determines whether or not the detected value of pressure sensor 12 matches any one of the setting values registered in the storage unit 50.

When the current fastening strength of the belt 120 is not different from any one of the stored settings (NO in step 111), the process ends. That is, since the setting value matches the detected value, the head-mounted display 100 can be worn with the setting suitable for the user U. Thus, the head-mounted display 100 can reproduce the content to the user U in a proper wearing state.

When the current fastening strength of the belt 120 is different from any one of the stored settings (YES in S 111), the head-mounted display 100 asks the user U whether the current fastening strength is recorded (S 112). That is, the head-mounted display 100 asks the user U whether or not the new setting value is stored in the storage unit 50. The display unit 30 displays a message or a "YES/NO" button the user U can push inquiring whether the current fastening strength is stored.

The control unit 20 determines whether or not recording data is chosen (S 113). For example, the user U operates operation unit 60, therefore the user U can choose to record the data. When the user U chooses to record the current fastening strength (YES in S 113), the storage unit 50 records the current fastening strength (S 114). That is, the user U operates operation unit 60 and clicks the registration of the current value button 204 on the menu screen 200 in FIG. 5. As a result, data such as the current detected value of pressure sensor 12 and the position or length of the belt 120 are written in the storage unit 50. After this, the process ends. When the user U does not choose to record the current fastening strength (NO in S 113), the storage unit 50 does not record the current fastening strength (S 115). After this, the process ends.

By the adjustment method described above, the user U can wear the head-mounted display 100 with a setting suitable for the user U. Since the drive unit 40 tightens the belt 120, a complicated way of putting on the head-mounted display 100 can be avoided. Instead, the user U can simply and appropriately put on the head-mounted display 100. Even when the user U repeatedly puts on and removes the head-mounted display 100, the user U can wear the head-mounted display in which the fastening strength is constant.

In this manner, based on the captured image, the control unit 20 detects the horizontal or vertical positions of the left and right eyes with respect to the head-mounted display 100. The control unit 20 determines whether or not the positions of the left and right eyes of the user U are symmetrical in at least one direction of the vertical direction and the horizontal direction. When the positions of the left and right eyes of the user U are symmetrical in at least one direction of the vertical direction and horizontal directions, the control unit 20 drives the drive unit 40 to fasten the belt 120. Further, the control unit 20 determines whether or not the positions of the left and right eyes of the user U are symmetrical in at least one direction of the vertical direction and the horizontal direction. When the positions of the left and right eyes of the user U are not symmetrical in the vertical direction or the horizontal direction, the control unit 20 drives drive unit 40 to loosen belt 120. This allows the user U to wear the head-mounted display 100 in which the fastening strength is appropriate. That is, the head-mounted display 100 can be worn by the user U in a state in which it is held steady. The user U can view the display image in an appropriate wearing state. The control unit 20 may determine whether or not the positions of the left and right eyes are symmetrical in both the horizontal and vertical directions. When the positions of the left and right eyes are symmetrical in both the horizontal and vertical directions, the control unit 20 determines that the user U is wearing the head-mounted display 100 symmetrically. In other words, when the positions of the left and right eyes are not symmetrical in the horizontal or vertical directions, the control unit 20 determines that the user U is not wearing the head-mounted display 100 symmetrically.

Further, the user U can register the setting suitable for himself or herself in the storage unit 50. Therefore, when a plurality of users U use one head-mounted display 100, each user U can easily put on and the head-mounted display 100 so that it is worn appropriately.

Figure 6:
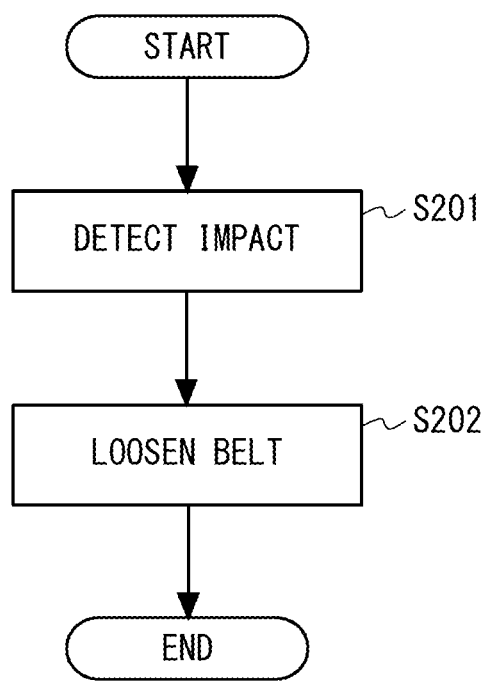
FIG. 6 is a flowchart showing control when an impact is detected.

Next, a flow when the impact detection unit 14 detects an impact will be described with reference to FIG. 6. First, the impact detection unit 14 detects the impact (S 201). For example, when the acceleration detected by the acceleration sensor exceeds a threshold value, the impact detection unit 14 detects the impact. When the impact is detected, the drive unit 40 loosens the belt 120 (S 202). Thus, the head-mounted display 100 is removed from the head of the user U.

For example, when the user U falls over and an impact is applied to the head-mounted display 100, a large acceleration is generated. Thus, the impact detection unit 14 can detect the impact based on the acceleration. When the impact is applied to the head-mounted display 100, the head-mounted display 100 is promptly removed from the head of the user U. Therefore, the user U can avoid any danger caused by the impact.

Figure 7:
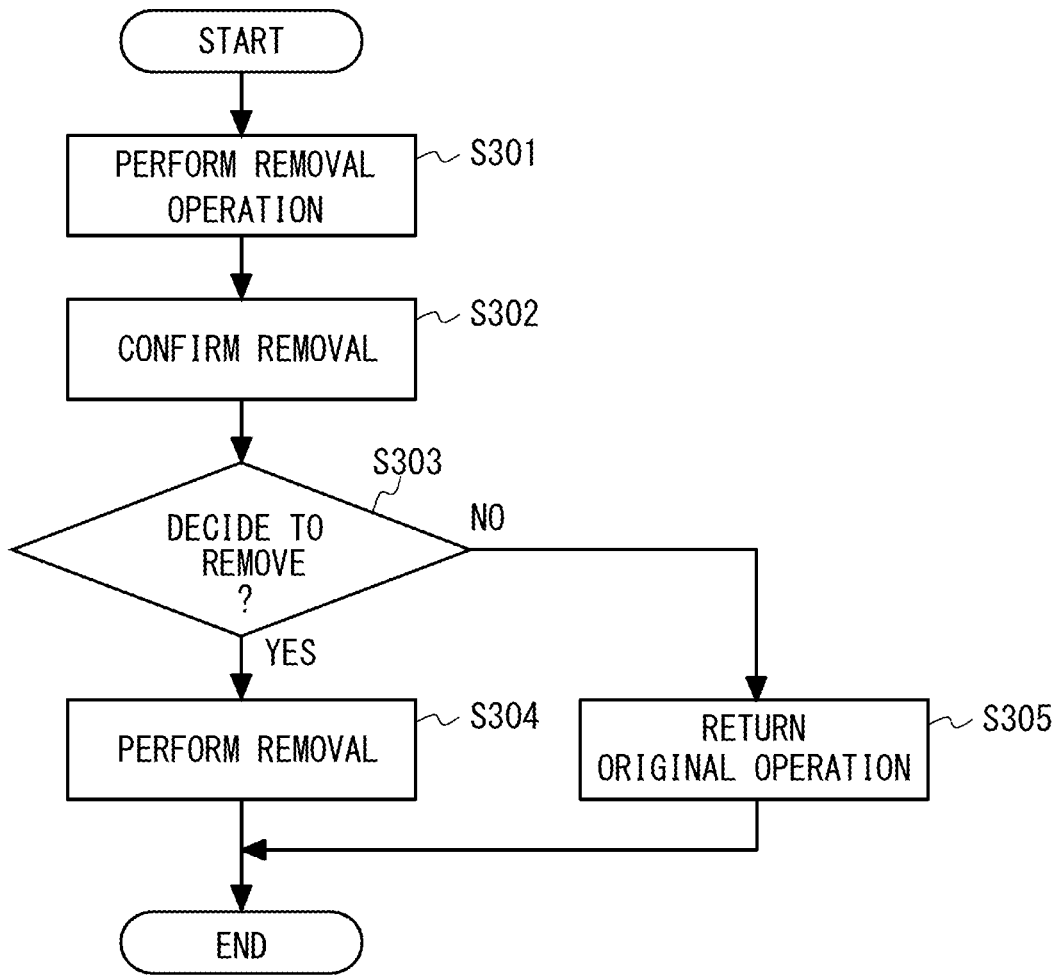
FIG. 7 is a flowchart showing control for removing the head-mounted display.

Next, a flow when the user U takes the head-mounted display 100 off will be described with reference to FIG. 7. FIG. 7 is a flowchart showing a control at the time of removal of the head-mounted display.

First, the user U performs a removal operation (S 301). For example, in order to perform the removal operation, the user U clicks the removal button 202 on the menu screen shown in FIG. 5. Then, the control unit 20 confirms the removal (S 302). For example, the display unit 30 displays a message or a "YES/NO" button asking the user U whether or not the user U will remove the head-mounted display 100.

Then, the control unit 20 determines whether or not the user U has decided to remove the head-mounted display 100 (S 303). When the user U has decided to remove the head-mounted display 100 (YES in S 303), the head-mounted display performs the removal action (S 304). That is, when the user U clicks the YES button, the drive unit 40 loosens the belt 120. In this manner, the head-mounted display 100 can be removed. If the user U does not decide to remove the head-mounted display 100 (NO in S 303), the operation returns to the original operation (S 305). When the user U clicks the NO button, the drive unit 40 maintains the setting. The drive unit 40 will keep the fastening strength of the belt, and the head-mounted display 100 will play the content and so on. In this manner, the fastening strength can be kept constant until the user U decides to remove the head-mounted display. Thus, a state in which the head-mounted display is worn appropriately can be maintained.

Although the embodiments of the invention made by the present inventors are described in the foregoing, the present invention is not restricted to the above-described embodiments, and various changes and modifications may be made without departing from the scope of the invention. Two or more embodiments as set forth above may be combined as appropriate.

What is claimed is:

1. A head-mounted display comprising:
 a main body configured to generate a display image;
 a belt configured to fix the main body to a head of a user;
 a first sensor configured to detect a fastening strength of the belt;
 a storage unit configured to store a setting regarding the fastening strength of the belt;
 a drive unit configured to fasten the belt in accordance with a detection result of the first sensor and the setting;
 an acceleration sensor configured to detect an acceleration of the head-mounted display; and
 an impact detection unit configured to detect an impact applied to the head-mounted display when the acceleration is greater than a threshold value,
 wherein the drive unit loosens the belt when the impact detection unit detects the impact.

2. The head-mounted display according to claim 1, wherein the storage unit stores a plurality of settings selected by the user; and
 wherein the drive unit fastens the belt so that the detected fastening strength detected by the first sensor is set to the setting selected by the user.

3. The head-mounted display according to claim 1, further comprising a second sensor configured to detect eyes of the user; and
 a control unit configured to control the drive unit in accordance with positions of left and right eyes detected by the second sensor.

4. The head-mounted display according to claim 3, wherein after the drive unit fastens the belt in accordance with a setting of the fastening strength set by the user, the control unit determines whether or not the positions of the left and the right eyes are symmetrical in at least one of a lateral direction and a vertical direction, and the control unit drives the drive unit to loosen the belt when the positions of the left and right eyes are not symmetrical.

5. The head-mounted display according to claim 3, wherein after the user sets the fastening strength:

the control unit determines whether or not the positions of the left and the right eyes are symmetrical in at least one of a lateral direction and a vertical direction; and the control unit drives the drive unit to fasten the belt when the positions of the left and right eyes are symmetrical.

6. The head-mounted display according to claim 1, wherein the drive unit loosens the belt so that the head-mounted display is removed from the head of the user when the impact detection unit detects the impact.

7. A method for adjusting a head-mounted display the head-mounted display comprising:

a main body configured to generate a display image;

a belt configured to fix the main body to a head of a user; and a drive unit configured to fasten the belt, the method comprising;

detecting a fastening strength of the belt;

fastening, by the drive unit, the belt in accordance with the fastening strength and a predetermined setting;

detecting an acceleration of the head-mounted display, detecting an impact applied to the head-mounted display when the acceleration is greater than a threshold value; and loosening the belt when the impact is applied to the head-mounted display.

\* \* \* \* \*